(12) United States Patent
Klein Koerkamp

(10) Patent No.: US 12,350,929 B2
(45) Date of Patent: Jul. 8, 2025

(54) METHOD FOR CONTROLLING A DIGITAL INKJET PRINTER

(71) Applicant: Canon Production Printing Holding B.V., Venlo (NL)

(72) Inventor: Koen J. Klein Koerkamp, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 190 days.

(21) Appl. No.: 18/368,287

(22) Filed: Sep. 14, 2023

(65) Prior Publication Data

US 2024/0100821 A1 Mar. 28, 2024

(30) Foreign Application Priority Data

Sep. 23, 2022 (EP) ..................... 22197297

(51) Int. Cl.
*B41J 2/045* (2006.01)
*B41J 2/165* (2006.01)
(Continued)

(52) U.S. Cl.
CPC ....... *B41J 2/04503* (2013.01); *B41J 2/04526* (2013.01); *B41J 2/04586* (2013.01);
(Continued)

(58) Field of Classification Search
CPC .. B41J 2/16505; B41J 2/1721; B41J 2/16508; B41J 2/16526; B41J 2/04586;
(Continued)

(56) References Cited

U.S. PATENT DOCUMENTS

| | | | | |
|---|---|---|---|---|
| 2017/0300276 A1* | 10/2017 | Arakane | ............... | B41J 2/16508 |
| 2019/0143695 A1* | 5/2019 | Cabello | ............... | B41J 2/16508 347/32 |
| 2022/0242126 A1 | 8/2022 | Arakane et al. | | |

FOREIGN PATENT DOCUMENTS

| | | |
|---|---|---|
| JP | 7-60969 A | 3/1995 |
| JP | 2004-195749 A | 7/2004 |

OTHER PUBLICATIONS

European Search Report, issued in Application No. 22 19 7297, dated Feb. 15, 2023.

* cited by examiner

*Primary Examiner* — Thinh H Nguyen
(74) *Attorney, Agent, or Firm* — Birch, Stewart, Kolasch & Birch, LLP

(57) ABSTRACT

In a method for printing a digital image in swaths with a swath time corresponding to the width of the digital image on the image receiving medium in the main scanning direction, the print controller issues a trigger that a spitting action for at least part of the printing elements of the print head needs to be performed. A swath time of subsequent swaths is gradually increased until the print head reaches a maintenance tray at a side of the print surface. The print head stays at the maintenance tray until air between the print head and the maintenance tray has approximately reached a standstill. Then, at least part of the printing elements of the print head are spitting marking material in the maintenance tray. After the spitting, the swath time of subsequent swaths is gradually decreased until the swath time is corresponding again with the width of the digital image on the image receiving medium in the main scanning direction. A digital inkjet printer is configured to perform the method.

11 Claims, 5 Drawing Sheets

(51) Int. Cl.
*B41J 2/17* (2006.01)
*B41J 19/20* (2006.01)
*G06K 15/10* (2006.01)
*G06K 15/16* (2006.01)

(52) U.S. Cl.
CPC ......... *B41J 2/16508* (2013.01); *B41J 2/1721* (2013.01); *B41J 19/202* (2013.01); *G06K 15/102* (2013.01); *G06K 15/16* (2013.01)

(58) Field of Classification Search
CPC . B41J 2/04503; B41J 2/195; B41J 2/19; B41J 19/202; B41J 2002/16573
See application file for complete search history.

METHOD FOR CONTROLLING A DIGITAL INKJET PRINTER

The present invention relates to a method of controlling a digital inkjet printer for printing images on an image receiving medium on a printing surface, the digital inkjet printer comprising a print controller, a print head with an array of printing elements for ejecting marking material on the image receiving medium and a maintenance tray for receiving marking material spit from at least part of the printing elements of the array, the print head mounted on a carriage that is guided on guide rails and being arranged to scan the image receiving medium in a main scanning direction in order to print swaths of marking material on the image receiving medium and to be moved relative to the image receiving medium in a sub-scanning direction normal to the main scanning direction in predetermined steps of relatively advancing the image receiving medium in the sub-scanning direction between passes of scanning the image receiving medium in the main scanning direction, wherein the maintenance tray is positioned at a side of the printing surface in the main scanning direction.

Marking material is meant to be an ink, for example an UV curable ink.

Image receiving medium is meant to be paper, plastic, metal, wood, transparent material, glass, cardboard, label stock, coated paper, textile or any other printable medium.

The digital inkjet printer may hereinafter also be called an inkjet printing assembly.

BACKGROUND OF THE INVENTION

During printing unused printing elements also known as nozzles need to spit to prevent drying in of ink. This is done by spitting in the maintenance tray at the side of the print surface. Due to the longer swath time during spitting, gloss banding may become visible. Until now, spitting was done in the maintenance tray, but also only very limited in the print. Unused nozzles were not kept in a good condition, resulting in print quality artifacts when the nozzles were used after several minutes of inactivity.

Therefore a need exists for spitting during printing without print quality artifacts like gloss banding.

It is therefore an object of the present invention to provide such a method.

It is another object of the present invention to provide an inkjet printer suitable for performing such a method.

SUMMARY OF THE INVENTION

The object is achieved in a method according to the invention, the method comprising the steps of:
a) printing a digital image in swaths with a swath time corresponding to the width of the digital image on the image receiving medium in the main scanning direction,
b) the print controller issuing or receiving a trigger that a spitting action for at least part of the printing elements of the print head needs to be performed,
c) gradually increasing a swath time of subsequent swaths until the print head reaches the maintenance tray,
d) the print head staying at the maintenance tray for a predetermined amount of time for preparation of spitting at subsequent swaths,
e) the at least part of the printing elements of the print head spitting marking material in the maintenance tray, and
f) after the spitting in step e) gradually decreasing the swath time of subsequent swaths until the swath time is corresponding again with the width of the digital image on the image receiving medium in the main scanning direction.

By gradually increasing the swath time, the swath time difference of consecutive swaths is kept small, which makes gloss differences unnoticeable. A first part of the swath time the print head is printing at least a part of the digital image. A second part of the swath time the print head is moving in the direction of the maintenance tray. A third part of the swath time the printhead reaches the maintenance tray and stays at the maintenance tray. In the consecutive swaths the second part of the swath time is increasing from zero to a time that the maintenance tray is reached. After increasing the second part of the swath time, in the consecutive passes the third part of the swath time is also increasing from zero to the predetermined amount of time. By increasing the third part of the swath time until the predetermined amount of time has lapsed, air between the print head and the maintenance tray may approximately reach a standstill. Said standstill is advantageous in order to avoid landing of ink particles outside of the maintenance tray due to moving air. After spitting, in the consecutive passes the third part of the swath time is decreasing to zero. After decreasing the third part to zero, in the consecutive passes the second part is decreasing to zero. After decreasing the second part to zero, the swath time of the consecutive passes only exists of the first part.

According to an embodiment the method comprises the step of optimizing a difference in swath times during the gradually increasing and decreasing of the swath times under a condition to minimize or obviate an appearance of print artefacts due to the change of swath times.

According to a further embodiment the difference in swath times is selected to be maximal taking the condition into account.

According to an embodiment the difference in swath times during the gradually increasing and decreasing of the swath times is approximately 500 msec. A time difference between consecutive swaths may be chosen as large as possible, with a maximum of 500 msec. When for example a swath time increase of 1200 msec is required to spit in the maintenance tray, said increase is done in two steps of 500 msec and one step of 200 msec.

According to an embodiment a total time of the print head to stay at the maintenance tray in step d) is approximately 2 sec. The inventor has found that by doing so, it is prevented that spit ink particles are missing the goal of the maintenance tray.

According to an embodiment the swaths made on the image receiving medium during the increase of the swath times in step c) are only extended on a side towards the maintenance tray and the swaths made on the image receiving medium during the decrease of the swath times in step f) are only reduced on the side from the maintenance tray.

According to an embodiment the trigger is issued or received each x minutes, wherein x is greater or equal to 4.

The present invention also relates to a digital inkjet printer for printing images on an image receiving medium on a printing surface, the digital inkjet printer comprising a print controller, a print head with an array of printing elements for ejecting marking material on the image receiving medium and a maintenance tray for receiving marking material spit from at least part of the printing elements of the array, the print head mounted on a carriage that is guided on guide rails and being arranged to scan the image receiving medium in a main scanning direction in order to print swaths of marking material on the image receiving medium and to be moved relative to the image receiving medium in a sub-scanning direction normal to the main scanning direction in predetermined steps of relatively advancing the image receiving medium in the sub-scanning direction between passes of scanning the image receiving medium in the main scanning direction, wherein the maintenance tray is positioned at a side of the printing surface in the main scanning direction, wherein the print controller is configured to control a printing a digital image in swaths with a swath time corresponding to the width of the digital image on the image receiving medium in the main scanning direction, to issue or receive a trigger that a spitting action for at least part of the printing elements of the print head needs to be performed, to gradually increasing a swath time of subsequent swaths until the print head reaches the maintenance tray, to control the print head to stay at the maintenance tray for a predetermined amount of time for preparation of spitting at subsequent swaths and thereafter the at least part of the printing elements of the print head to spit marking material in the maintenance tray, and after the spitting to gradually decrease the swath time of subsequent swaths until the swath time is corresponding again with the width of the digital image on the image receiving medium in the main scanning direction.

The present invention also relates to a software product comprising program code on a machine-readable medium, which program code, when loaded into a print controller of a digital inkjet printer, causes the print controller to control the digital inkjet printer in accordance with a method according to the invention.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
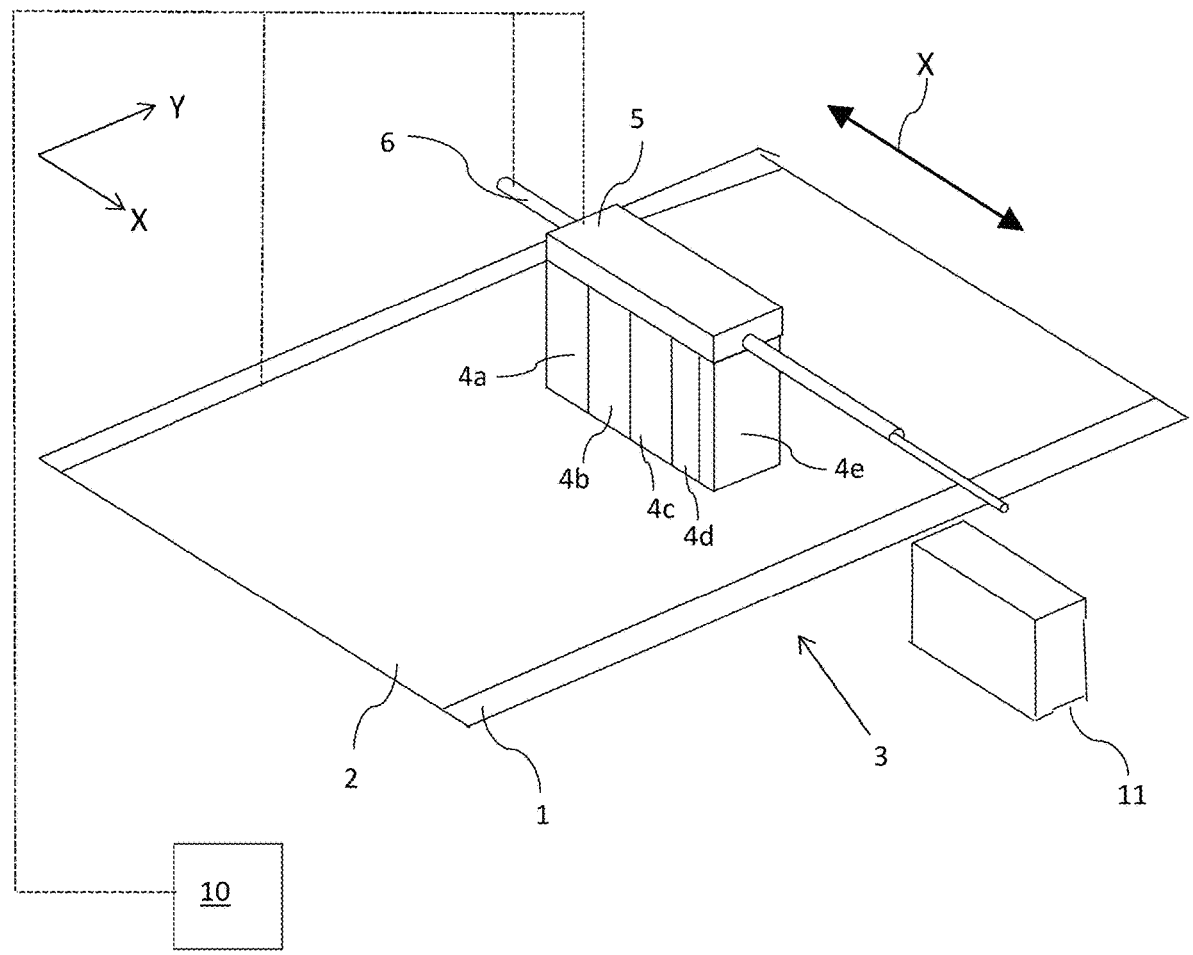
FIG. 1(a) shows a schematic representation of an inkjet printing system according to the present invention.
Figure 1B:
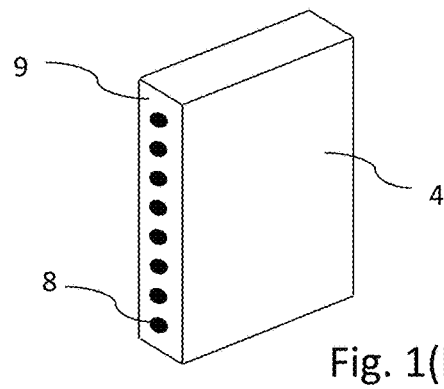
FIG. 1(b) shows a schematic representation of an inkjet print head according to the present invention.

FIG. 1(a) shows an ink jet printing assembly 3. The ink jet printing assembly 3 comprises supporting means for supporting an image receiving medium 2. The supporting means are shown in FIG. 1(a) as a flat surface 1, but alternatively, the supporting means may be a platen, for example a rotatable drum that is rotatable around an axis. The supporting means may be optionally provided with suction holes for holding the image receiving medium 2 in a fixed position with respect to the supporting means. The ink jet printing assembly 3 comprises print heads 4a-4e, mounted on a scanning print carriage 5. The scanning print carriage 5 is guided by suitable guiding means 6 to move in reciprocation in the main scanning direction X. Each print head 4a-4e comprises an orifice surface 9, which orifice surface 9 is provided with at least one orifice 8, as is shown in FIG. 1(b). The print heads 4a-4e are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is relatively moved in the sub-scanning direction Y over the flat surface 1 along a plurality of print heads 4a-4e provided with a fluid marking material.

A scanning print carriage 5 carries the plurality of print heads 4a-4e and may be moved in reciprocation in the main scanning direction X parallel to the platen 1, such as to enable scanning of the image receiving medium 2 in the main scanning direction X. Only five print heads 4a-4e are depicted for demonstrating the invention. In practice an arbitrary number of print heads may be employed. For example, for a black-and-white printer, at least one print head 4a-4e, usually containing black marking material is present. Alternatively, a black-and-white printer may comprise a white marking material, which is to be applied on a black image-receiving medium 2. For a full-color printer, containing multiple colors, at least one print head 4a-4e for each of the colors, usually black, cyan, magenta, yellow and white is present.

The carriage 5 is guided by guiding means 6. These guiding means 6 may be a rod as depicted in FIG. 1(a). Although only one rod 6 is depicted in FIG. 1(a), a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4e comprises an orifice surface 9 having at least one orifice 8, in fluid communication with a pressure chamber containing fluid marking material provided in the print head 4a-4e. On the orifice surface 9, a number of orifices 8 are arranged in a single linear array parallel to the sub-scanning direction Y, as is shown in FIG. 1(b). Alternatively, the nozzles may be arranged in the main scanning direction X. Eight orifices 8 per print head 4a-4e are depicted in FIG. 1(b), however obviously in a practical embodiment several hundreds of orifices 8 may be provided per print head 4a-4e, optionally arranged in multiple arrays. As depicted in FIG. 1(a), the respective print heads 4a-4e are placed parallel to each other. The print heads 4a-4e may be placed such that corresponding orifices 8 of the respective print heads 4a-4e are positioned in-line in the main scanning direction X. This means that a line of image dots in the main scanning direction X may be formed by selectively activating up to five orifices 8, each of them being part of a different print head 4a-4e. This parallel positioning of the print heads 4a-4e with corresponding in-line placement of the orifices 8 is advantageous to increase productivity and/or improve print quality. Alternatively multiple print heads 4a-4e may be placed on the print carriage adjacent to each other such that the orifices 8 of the respective print heads 4a-4e are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 further comprises a maintenance tray 11. The maintenance tray 11 is positioned at a side of the print surface 1. As shown in FIG. 1(*a*), the guiding means 6 are extending towards and above the maintenance tray 11 in order to move the print heads 4*a*-4*e* in the main scanning direction X above or even inside of the maintenance tray 11. By doing so, the print heads 4*a*-4*e* are able to spit marking material in the maintenance tray 11.

According to an embodiment the ink jet assembly 3 is a roll printer and the image receiving medium 2 is moving in the sub-scanning direction Y. According to said embodiment the maintenance tray 11 is at a fixed position at an end of the guiding means 6.

According to another embodiment the ink jet printing assembly 3 is a flatbed printer and the carriage 5 is also moving in the sub-scanning direction Y. The maintenance tray 11 is mounted on the guiding means 6 and moves in the sub-scanning direction Y at the same length position (in the sub-scanning direction Y) as the carriage 5 does, i.e. as the print heads 4*a*-4*e* do.

In case of UV printing curing means (not shown) may be provided near the print heads 4*a*-4*e*. The flat surface 1, the temperature control means, the carriage 5, the print heads 4*a*-4*e* are controlled by a suitable print controller 10.

Figure 2:
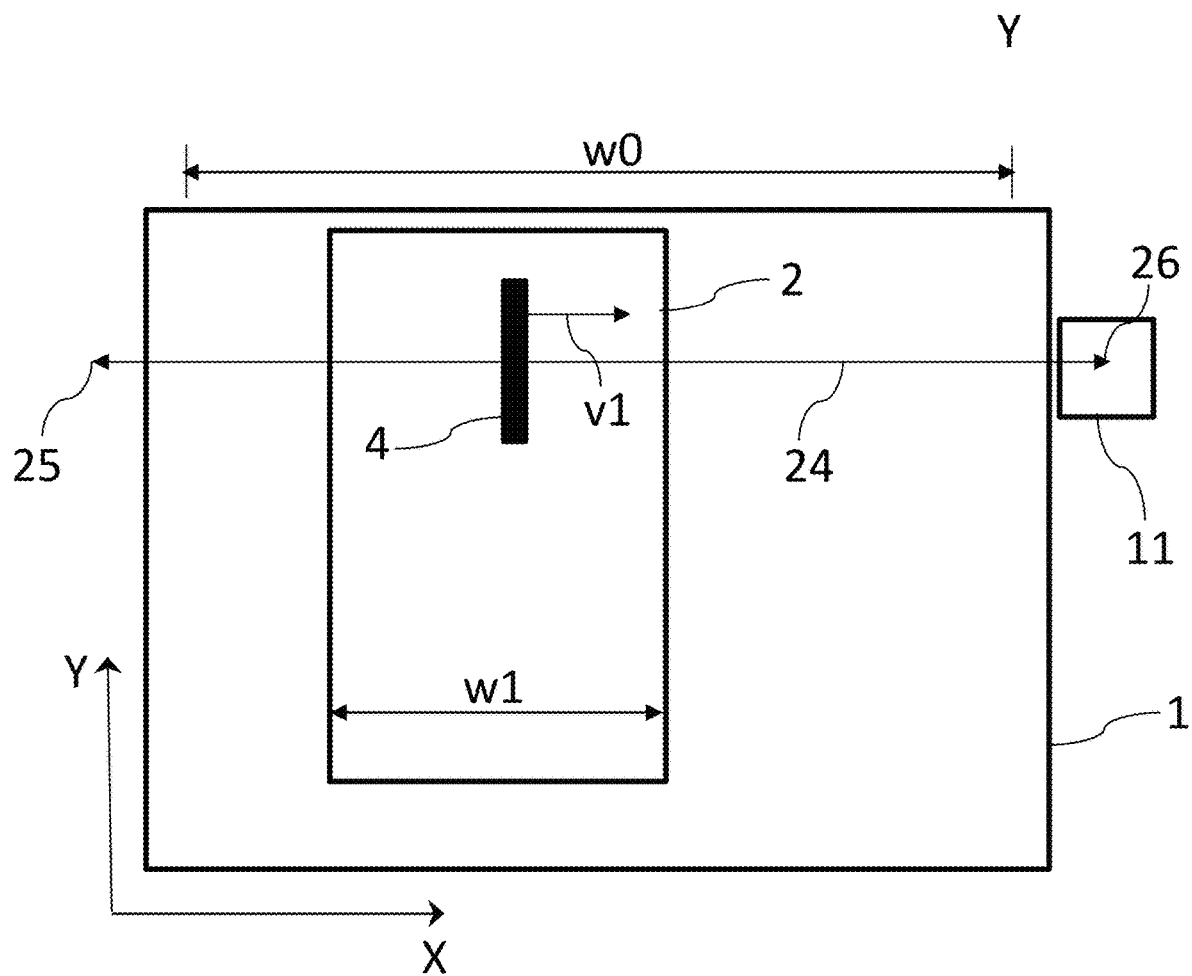
FIG. 2 schematically shows a first example of the method according to the present invention.

FIG. 2 schematically shows an example of the method according to the present invention. An image receiving medium 2 is provided on the platen 1 and has a medium width w1 in the main scanning direction X which is smaller than the maximum media width w0 in the main scanning direction X which can be handled by the digital inkjet printer 3. The invention may also be applied for any image receiving medium width up to the maximum width w0. The print heads 4 and the maintenance tray 11 are shown along a trajectory 24. The trajectory 24 comprises passes from a left side turning point 25 towards a right side turning point 26 and vice versa. In the turning points 25,26 the direction of the carriage 5 with print heads 4 is inverted. The image receiving medium 2 is relatively moved in the sub-scanning direction Y underneath the print heads 4 and the maintenance tray 11 in such a way that a swath produced in a pass of the print heads 4 in the main direction X is at least partially overlapping with a swath produced in a next or the same pass in the main scanning direction X in an opposite direction. The print heads 4 are bi-directionally moving with a velocity v1 in the main scanning direction X. According to the present invention the print controller 10 may get a trigger that a spitting action needs to be performed. At such an event, the swaths—which are originally only occupying the image receiving medium width w1—are gradually extended towards the maintenance tray 11 in the main scanning direction X until the print heads 4 are above the maintenance tray 11. Said gradually extension goes even beyond the maximum medium width w0, since the maintenance tray 11 is positioned besides of a side of the platen 1. When the spitting action is completed, the swaths are gradually reduced to the original image receiving medium width w1.

Figure 3A:
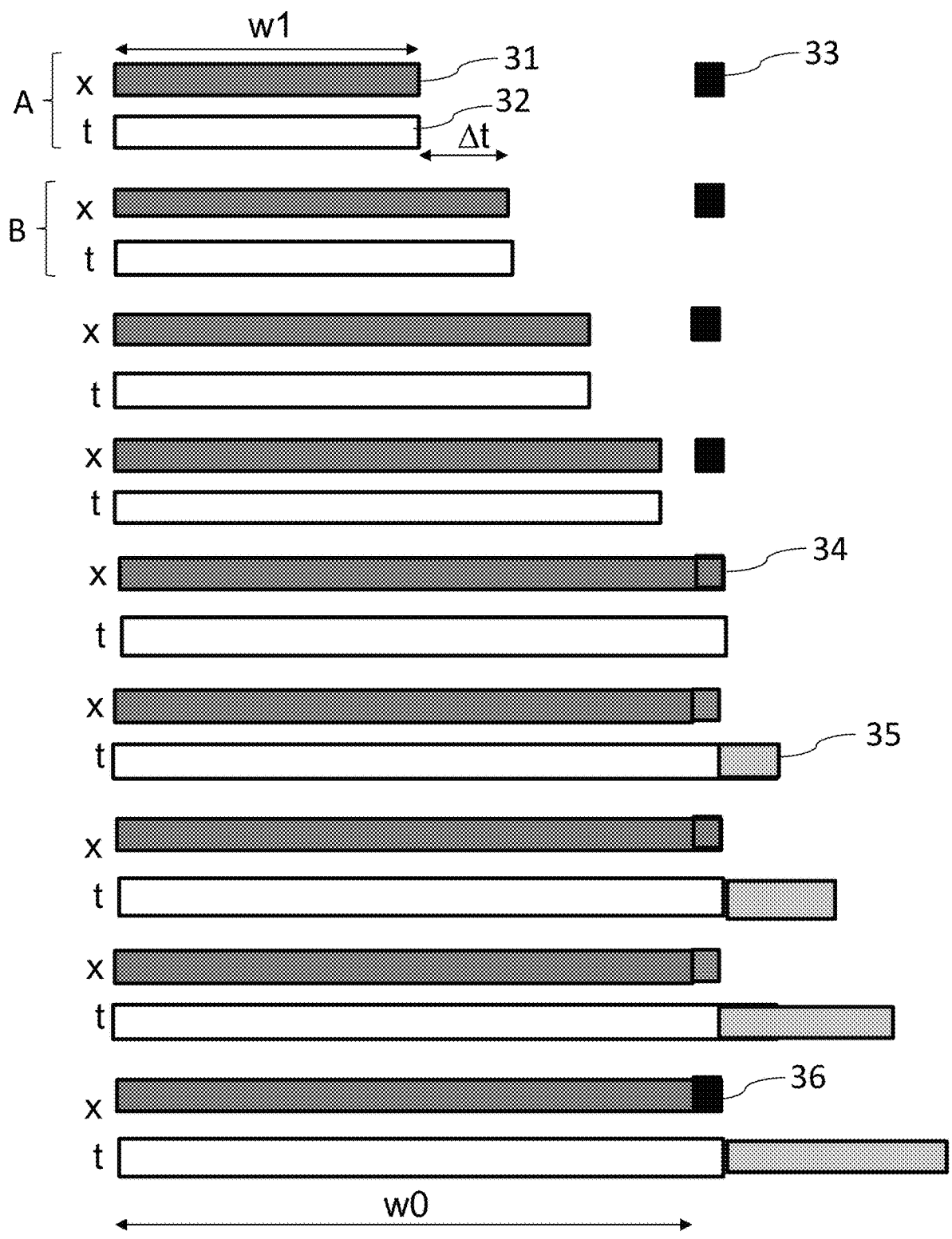
FIGS. 3(a)-3(b) schematically show a second example of the method according to the present invention.
Figure 3B:
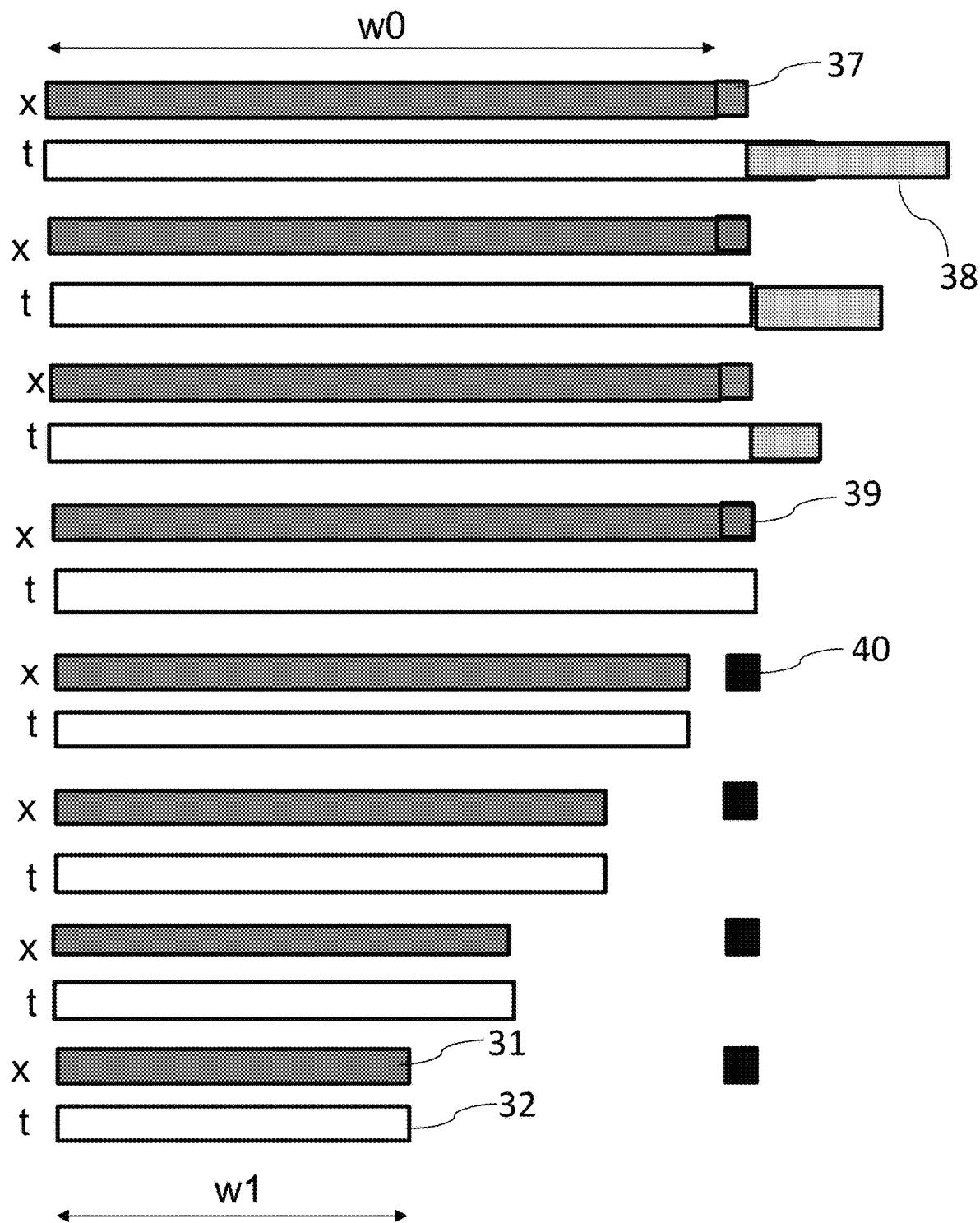

FIG. 3(*a*)-3(*b*) schematically shows an embodiment of the method according to the present invention. In FIG. 3(*a*) a first swath A is denoted by a first rectangle 31 and a second rectangle 32. The first rectangle 31 represents a swath having a swath width x. The second rectangle 32 represents an amount of time t needed for the swath A represented by the first rectangle 31. A black square 33 represents the maintenance tray 11 according to the present invention. The maintenance tray is situated at the right side of the printing surface 1. However, a maintenance tray being situated at the left side of the printing surface 1 may also be envisioned.

The first swath A has a swath width equal to the width w1 of the image receiving medium 2. During the first swath A a trigger is received or issued by the print controller 10 to perform a spit action. The print controller 10 monitors a status of each printing element 8.

In a first action according to the present invention the swath time is now increased with an difference amount of time Δt. The second swath B has now a duration which is an time amount Δt greater than the duration of the first swath A. According to an embodiment the difference amount of time Δt is utmost 500 milliseconds. During the time period in the second swath B after the original swath time of the first swath A, i.e. within the Δt time period in the second swath B, no printing is involved, because within the Δt time period the print head 4 is not positioned anymore above the image receiving medium 2 which has a width w1. The pass width x of the second swath B is increased in the direction of the maintenance tray 11 represented by the black square 33. In the subsequent passes the swath time is further increased with the same amount of time Δt, until the swath has such a width that the swath encounters 34 the maintenance tray 11. At the end of the latter swath the print head 4 has a position 34 above the maintenance tray 11. The first action lasts a plurality of swaths, which plurality depends on the image receiving medium width w1 and a position of the image receiving medium 2 on the print surface 1 in the main scanning direction X.

In a second action according to the present invention, before actual spitting, the preparation of the spitting is started which takes about 2 seconds in this example. Since the swath time of subsequent passes may only be increased with a time period Δt, another number of passes are produced of the same swath width, but with a larger swath time 35. This effect is achieved by letting the carriage 5 wait above the maintenance tray 11 for an amount of time Δt, 2Δt, 3Δt and 4Δt in the subsequent passes. It is noted that the time amount 4Δt equals the time needed for preparation of the spitting action, i.e. 2 seconds.

In a third action, at the end of the 4Δt period of time, the spitting 36 takes place with takes approximately a tenth of a second.

In FIG. 3(*b*) the swaths 37 after the spitting action 36 are shown.

In a fourth action the swath times are reduced with the Δt time period in consecutive passes by letting the carriage 5 stay a shorter time period 38 above the maintenance tray 11. In this example the first action lasts 3 passes until the swath width just includes 39 the maintenance tray 11 again.

In a fifth action the swath times are further reduced with the Δt time period in consecutive passes by letting the carriage 5 make passes with a smaller width so that the position 40 of the maintenance tray 11 is not reached any more. The fifth action lasts a plurality of swaths, in this example 4 passes, which plurality depends on the image receiving medium width w1 and a position of the image receiving medium 2 on the print surface 1 in the main scanning direction X. At last the swath time is returned to the original swath time 32 and the swath width is returned to the original swath width 31 which corresponds to the image receiving medium width w1.

According to an embodiment the maintenance tray 11 is composed of two parts.

A first part is a spit tray which has a top side which intersection is slightly larger than the foot print of the print heads 4 and has a bottom side which intersection is smaller than an intersection of the top side of a second part which is positioned beneath the first part. The first part may have a funnel shape. The second part is a replaceable waste ink container in which the spit ink is gathered.

Figure 4:
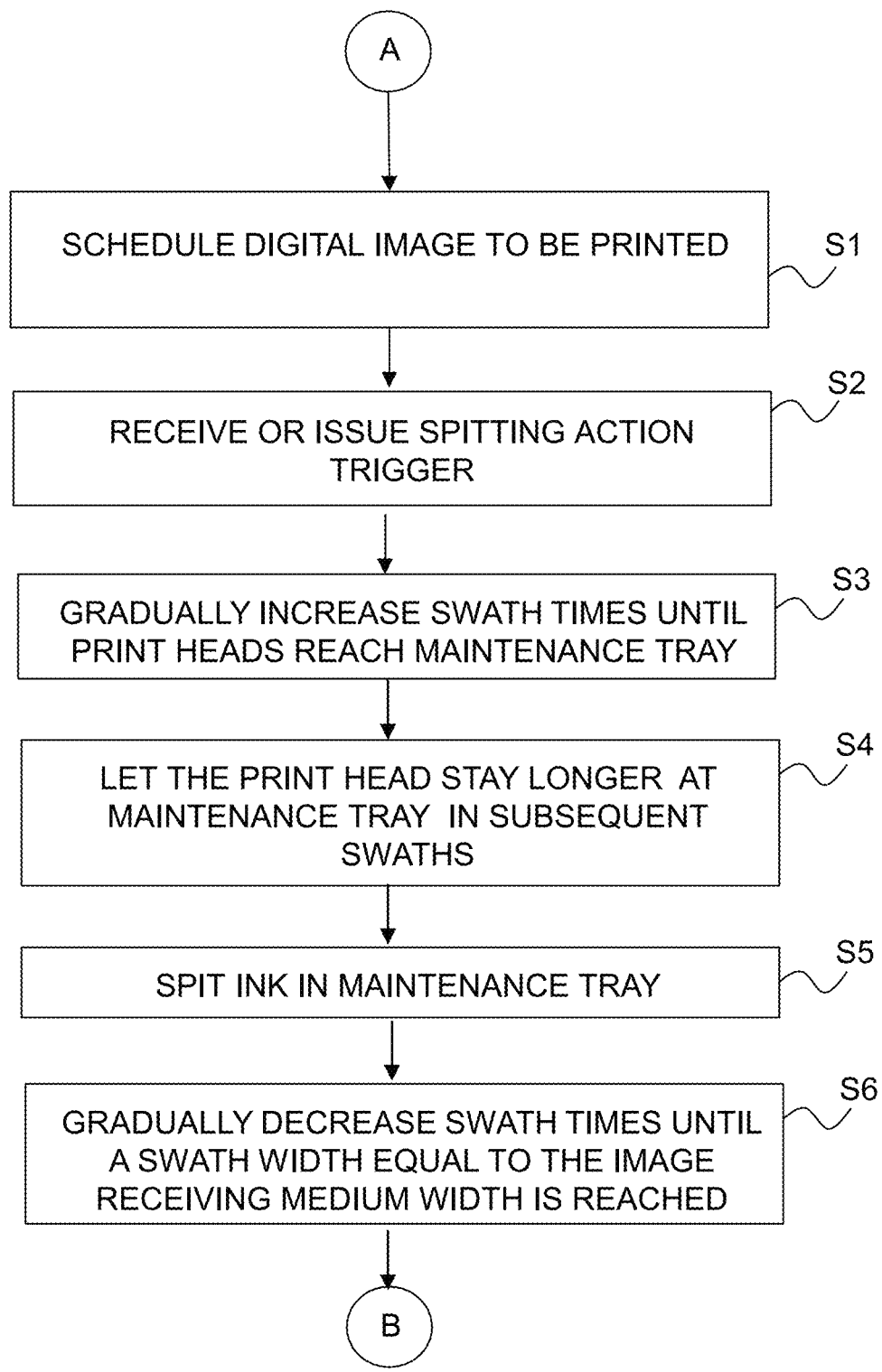
FIG. 4 is a flow diagram of the method according to the present invention.

FIG. 4 is a flow diagram of the method according to the present invention.

The method starts in a start point A which leads to a first step S1.

In the first step S1 a digital image is planned or scheduled to be printed in swaths with a swath time corresponding to the width w1 of the digital image on the image receiving medium 2 in the main scanning direction X.

In a second step S2 the print controller issues or receives a trigger that a spitting action for at least part of the printing elements 8 of the print head 4 needs to be performed.

In a third step S3 a swath time of subsequent swaths is gradually increased until the print head reaches the maintenance tray 11.

In a fourth step S4 the print head 4 stays at the maintenance tray 11 for a predetermined amount of time for preparation of spitting in subsequent swaths. Each subsequent swath the print head 4 stays longer at the position of the maintenance tray 11 until the preparation is finished.

In a fifth step S5 the at least part of the printing elements 8 of the print head 4 spits marking material in the maintenance tray 11.

In a sixth step S6, after the spitting in the fifth step S5 the swath time of subsequent swaths are gradually decreased until the swath time is corresponding again with the width w1 of the digital image on the image receiving medium 2 in the main scanning direction X.

The method ends in an end point B.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method of controlling a digital inkjet printer for printing images on an image receiving medium on a printing surface, the digital inkjet printer comprising a print controller, a print head with an array of printing elements for ejecting marking material on the image receiving medium and a maintenance tray for receiving marking material spit from at least part of the printing elements of the array, the print head mounted on a carriage that is guided on guide rails and being arranged to scan the image receiving medium in a main scanning direction in order to print swaths of marking material on the image receiving medium and to be moved relative to the image receiving medium in a sub-scanning direction normal to the main scanning direction in predetermined steps of relatively advancing the image receiving medium in the sub-scanning direction between passes of scanning the image receiving medium in the main scanning direction, wherein the maintenance tray is positioned at a side of the printing surface in the main scanning direction, the method comprising the steps of:
   a) printing a digital image in swaths with a swath time corresponding to the width of the digital image on the image receiving medium in the main scanning direction,
   b) the print controller issuing or receiving a trigger that a spitting action for at least part of the printing elements of the print head needs to be performed,
   c) gradually increasing a swath time of subsequent swaths until the print head reaches the maintenance tray,
   d) the print head staying at the maintenance tray for a predetermined amount of time for preparation of spitting at subsequent swaths,
   e) the at least part of the printing elements of the print head spitting marking material in the maintenance tray, and
   f) after the spitting in step e) gradually decreasing the swath time of subsequent swaths until the swath time is corresponding again with the width of the digital image on the image receiving medium in the main scanning direction.

2. The method according to claim 1, wherein the method comprises the step of optimizing a difference in swath times during the gradually increasing and decreasing of the swath times under a condition to minimize or obviate an appearance of print artefacts due to the change of swath times.

3. The method according to claim 2, wherein the difference in swath times is selected to be maximal taking the condition into account.

4. The method according to claim 2, wherein the difference in swath times during the gradually increasing and decreasing of the swath times is approximately 500 msec.

5. The method according to claim 1, wherein a total time of the print head to stay at the maintenance tray in step d) is approximately 2 sec.

6. The method according to claim 1, wherein the swaths made on the image receiving medium during the increase of the swath times in step c) are only extended on a side towards the maintenance tray and the swaths made on the image receiving medium during the decrease of the swath times in step f) are only reduced on the side from the maintenance tray.

7. The method according to claim 1, wherein the trigger is issued or received each x minutes, wherein x is greater or equal to 4.

8. A digital inkjet printer for printing images on an image receiving medium on a printing surface, the digital inkjet printer comprising a print controller, a print head with an array of printing elements for ejecting marking material on the image receiving medium and a maintenance tray for receiving marking material spit from at least part of the printing elements of the array, the print head mounted on a carriage that is guided on guide rails and being arranged to scan the image receiving medium in a main scanning direction in order to print swaths of marking material on the image receiving medium and to be moved relative to the image receiving medium in a sub-scanning direction normal to the main scanning direction in predetermined steps of relatively advancing the image receiving medium in the sub-scanning direction between passes of scanning the image receiving medium in the main scanning direction, wherein the maintenance tray is positioned at a side of the printing surface in the main scanning direction, wherein the print controller is configured to control a printing a digital image in swaths with a swath time corresponding to the width of the digital image on the image receiving medium in the main scanning direction, to issue or receive a trigger that a spitting action for at least part of the printing elements of the print head needs to be performed, to gradually increasing a swath time of subsequent swaths until the print head reaches the maintenance tray, to control the print head to stay at the maintenance tray for a predetermined amount of time for preparation of spitting at subsequent swaths and thereafter the at least part of the printing elements of the print head to spit marking material in the maintenance tray, and after the spitting to gradually decrease the swath time of subsequent swaths until the swath time is corresponding again with the width (w0) of the digital image on the image receiving medium in the main scanning direction.

9. A digital inkjet printer according to claim 8, wherein the digital inkjet printer is a flatbed printer and the carriage is configured to move in the main scanning direction as well in the sub-scanning direction.

10. A digital inkjet printer according to claim 8, wherein the digital inkjet printer is a roll printer and the carriage is configured to move in the main scanning direction and the digital inkjet printer comprises transport means which are configured to move the image receiving medium in the sub-scanning direction.

11. A software product comprising program code on a machine-readable medium, which program code, when loaded into a print controller of a digital inkjet printer, causes the print controller to control the digital inkjet printer in accordance with a method as claimed in claim 1.

* * * * *